No. 835,014. PATENTED NOV. 6, 1906.
T. C. DUNLAP.
THROTTLE VALVE.
APPLICATION FILED MAY 27, 1905.

Witnesses
Benj. Finckel
Alice B. Cook

Inventor
Thaddeus C. Dunlap,
by Finckel & Finckel
his Attorneys

UNITED STATES PATENT OFFICE.

THADDEUS C. DUNLAP, OF COLUMBUS, OHIO.

THROTTLE-VALVE.

No. 835,014.　　　　Specification of Letters Patent.　　　Patented Nov. 6, 1906.

Application filed May 27, 1905. Serial No. 262,676.

*To all whom it may concern:*

Be it known that I, THADDEUS C. DUNLAP, a citizen of the United States, residing at Columbus, in the county of Franklin and State of Ohio, have invented certain new and useful Improvements in Throttle-Valves for Fluid-Pressure Motors; and I do hereby declare the following to be a full, clear, and exact description of the invention, such as will enable others skilled in the art to which it appertains to make and use the same.

The object of the invention is to provide a simple, effective, and easily-manipulated throttle-valve for fluid-pressure motors, especially pneumatic motors.

The invention consists in the construction hereinafter described and claimed, the invention not being limited to precisely the forms of the parts shown.

Figure 1:
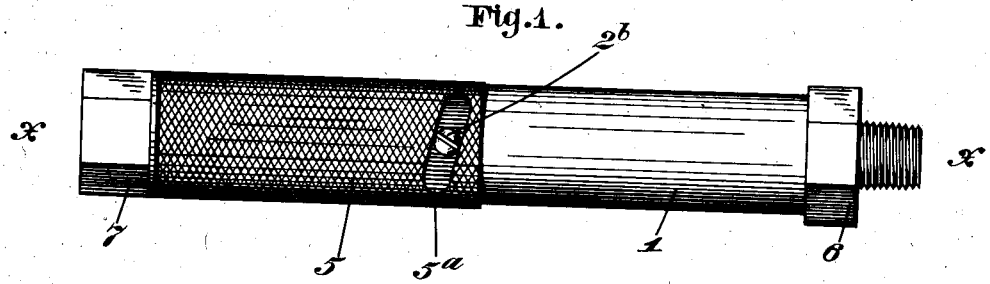
Figure 2:
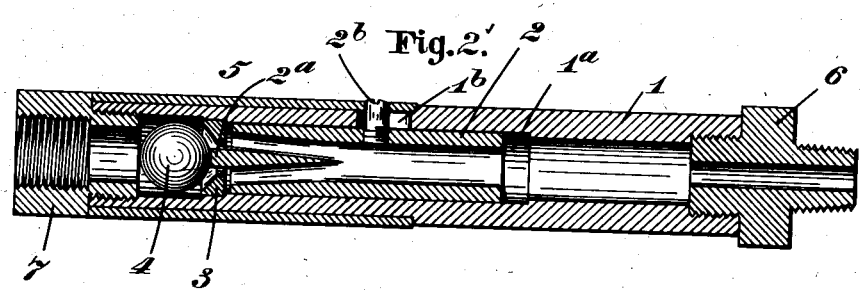
Figure 3:
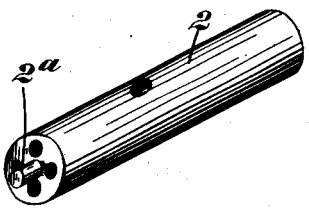

In the accompanying drawings, Figure 1 is an exterior view. Fig. 2 is a longitudinal sectional view on the line $x\ x$, Fig. 1. Fig. 3 is what I hereinafter denominate the "sliding tube" or "valve-unseating device."

In the several views, 1 designates a pipe or outer casing. This is bored internally to provide a chamber $1^a$, into which fits the sliding tube or valve-unseating device 2. The casing 1 is also bored to provide a place for the valve-seat 3.

4 designates the valve, which is of ball form and universally movable in the cavity provided for it. The piece constituting the valve-seat preferably has a very slightly concaved cavitous seat and is provided with a central orifice.

The sliding tube 2 is located on one side of the valve-seat, and the valve 4 is located on the opposite side. The sliding tube 2 is provided at its end next the valve-seat with a longitudinal projection $2^a$, adapted to be drawn, as hereinafter described, through the central orifice of the valve-seat to contact with the valve 4 and unseat the latter. The sliding tube 2 is also provided with a laterally-projecting pin $2^b$, that extends through a straight slot $1^b$ in the outer casing 1. Placed externally on the casing or pipe 1 is a rotary sleeve 5, provided with a slot $5^a$, inclined to the direction of its rotation. The pin $2^b$ on the sliding tube 2 projects into the slot $5^a$, so that by rotating the sleeve 5 the tube 2 may be reciprocated to unseat the valve 4 from its seat 3 or permit it to be seated by fluid-pressure. The outer pipe or casing 1 is provided at its right-hand end with a threaded coupling 6 for connecting the device to a motor and at its left-hand end with a threaded coupling for attaching the device to a source of fluid-pressure.

In operation the valve 4 is seated by the fluid-pressure as soon as the unseating device $2^a$ is thrown to the right, which is accomplished by turning the sleeve 5 in one direction. By turning the sleeve 5 in the contrary direction the projection $2^a$ is drawn through the orifice in the valve-seat against the valve and the latter thus pushed off its seat.

Among the advantages of this construction is that the contacting surface of the valve is constantly changing and the wear thereof made substantially uniform.

What I claim, and desire to secure by Letters Patent, is—

1. In a throttle for fluid-pressure motors, the combination of a pipe or casing, a valve-seat therein provided with an orifice, a sliding valve-unseating device located at one side of the valve-seat and provided with a projection to extend through the orifice in said seat and a universally-movable ball-valve on the opposite side of said valve-seat adapted to be unseated by said projection.

2. In a throttle for fluid-pressure motors, the combination of a pipe or casing, a valve-seat therein provided with an orifice, a universally-movable ball-valve within the casing on one side of the valve-seat, a sliding tube within the casing on the opposite side of the valve-seat provided with a longitudinal projection to extend through the valve-seat to unseat the valve, a rotary sleeve on the exterior of the casing provided with means to engage the aforesaid sliding tube to reciprocate the same to unseat the valve and permit the same to be seated.

3. In a throttle for fluid-pressure motors, the combination of a casing, a valve-seat therein, a universally-movable ball-valve on one side of the valve-seat, a sliding tube within the casing on the other side of the valve-seat provided with a longitudinal projection to extend through the valve-seat to unseat the valve and a lateral projection extending to the exterior of the casing, a rotary sleeve on the exterior of the casing provided with means to engage the sliding tube to reciprocate it to unseat the valve and permit the valve to be seated.

In testimony whereof I affix my signature in presence of two witnesses.

THADDEUS C. DUNLAP.

Witnesses:
BENJ. FINCKEL,
OLIN J. ROSS.